United States Patent [19]

Kensler, Jr. et al.

[11] 4,012,526
[45] Mar. 15, 1977

[54] OXYMETHYLENE DI-CARBOXYLIC ACID ESTERS AS ANTI-FUNGAL AGENTS AND ANIMAL GROWTH PROMOTERS

[75] Inventors: Daniel L. Kensler, Jr., Adel, Iowa; Gustave K. Kohn, Berkeley, Calif.; David D. Walgenbach, Brookings, S. Dak.

[73] Assignee: Chevron Research Company, San Francisco, Calif.

[22] Filed: July 21, 1975

[21] Appl. No.: 597,855

Related U.S. Application Data

[63] Continuation-in-part of Ser. No. 468,629, May 9, 1974, Pat. No. 3,931,412, which is a continuation-in-part of Ser. No. 266,945, June 28, 1972, abandoned, which is a continuation-in-part of Ser. No. 71,364, Sept. 11, 1970, abandoned, which is a continuation-in-part of Ser. No. 871,940, Oct. 28, 1969, abandoned.

[52] U.S. Cl. .............................................. 424/313
[51] Int. Cl.$^2$ ...................................... A61K 31/225
[58] Field of Search ........................... 424/311, 313

[56] References Cited

UNITED STATES PATENTS

| | | | |
|---|---|---|---|
| 3,219,630 | 11/1965 | Sidi | 260/67 R |
| 3,336,262 | 8/1967 | Sidi | 260/67 FP |

FOREIGN PATENTS OR APPLICATIONS

| | | |
|---|---|---|
| 881,102 | 11/1961 | United Kingdom |
| 1,036,344 | 7/1966 | United Kingdom |

*Primary Examiner*—V. D. Turner
*Attorney, Agent, or Firm*—G. F. Magdeburger; Dix A. Newell; Raymond Owyang

[57] ABSTRACT

Fungal growth in animal feedstuffs is inhibited by the use of di-carboxylic acid esters and compositions thereof. In addition to inhibiting the growth of fungi, the di-carboxylic acid esters increase the nutritional value of the animal feedstuff treated, and promote greater weight gain and feed efficiency response in animals fed the treated feedstuff compositions.

10 Claims, No Drawings

OXYMETHYLENE DI-CARBOXYLIC ACID ESTERS AS ANTI-FUNGAL AGENTS AND ANIMAL GROWTH PROMOTERS

CROSS-REFERENCE TO RELATED APPLICATIONS

This application is a continuation-in-part of application Ser. No. 468,629, filed May 9, 1974 now U.S. Pat. No. 3,931,412, which in turn is a continuation-in-part of application Ser. No. 266,945, filed June 28, 1972, now abandoned, which in turn is a continuation-in-part of application Ser. No. 71,364, filed Sept. 11, 1970, now abandoned, which in turn is a continuation-in-part of application Ser. No. 871,940, filed Oct. 28, 1969, now abandoned, the disclosures of which are incorporated by reference.

DESCRIPTION OF THE INVENTION

Animal feedstuffs are preserved against fungus attack and are increased in nutritional value in accordance with the present invention, by treatment thereof with a fungicidally effective and nutrition-improving amount of the di-carboxylic acid esters represented by the formula (I)

wherein R is alkyl of 1 to 6 carbon atoms or alkenyl of 2 to 6 carbon atoms, $R^2$ is alkyl of 1 to 6 carbon atoms or alkenyl of 2 to 6 carbon atoms, $R^1$ is hydrogen, alkyl of 1 to 6 carbon atoms, chloroalkyl of 1 to 4 carbon atoms and 1 to 5 chloro groups, alkenyl of 2 to 6 carbon atoms, phenyl or alkylphenyl of 7 to 10 carbon atoms, and $n$ is 1, 2 or 3.

Representative alkyl groups which R, $R^1$ and $R^2$ may represent include methyl, ethyl, n-propyl, isopropyl, n-butyl, isobutyl, n-pentyl, 2-methylbutyl, hexyl and isohexyl.

Representative alkenyl groups which R, $R^1$ and $R^2$ may represent include vinyl, allyl, 2-butenyl, 4-butenyl and 3-hexenyl.

Representative alkylphenyl $R^1$ groups are o-tolyl, p-tolyl, xylyl, 2,4,6-trimethylphenyl, 2,4-diethylphenyl and 4-t-butylphenyl.

Representative chloroalkyl $R^1$ groups are chloromethyl, dichloromethyl, trichloromethyl, pentachloroethyl, 3-chloropropyl and 2-chlorobutyl.

R and $R^2$ are preferably alkyl of 1 to 3 carbon atoms. More preferably, R and $R^2$ are the same alkyl group.

$R^1$ is preferably hydrogen or alkyl of 1 to 3 carbon atoms, especially methyl.

Representative di-esters and bis-esters of Formula (I) are illustrated in Table I, wherein R, $R^1$, $R^2$ and $n$ have the same significance as previously defined. As employed herein, the term "di-ester" refers to symmetrical or nonsymmetrical esters of Formula (I), and the term "bis-ester" refers to symmetrical esters of Formula (I) (R and $R^2$ are the same).

The di-esters of the invention are suitably employed alone or as a mixture of several different di-esters.

The preferred di-esters of the invention are mono-, di- or trioxymethylene bis-alkanoates [i.e., bis-esters of Formula (I) wherein R and $R^2$ are the same alkyl, $R^1$ is hydrogen and $n$ is 1, 2 or 3].

PREPARATION OF THE DI-ESTERS

The di-esters can be prepared by the reaction of a carboxylic acid anhydride and formaldehyde or aldehydes according to the following Equation (1)

wherein R, $R^1$, $R^2$ and $n$ have the same significance as previously defined.

Generally, stoichiometric amounts of the aldehyde and anhydride are used. Polymers of the aldehydes, e.g., trioxane and paraformaldehyde, that depolymerize under reaction conditions are convenient sources of the same aldehydes. The reaction is catalyzed with Lewis acids such as boron tri-fluoride or strong inorganic acids such as sulfuric, perchloric or phosphoric acid. Reaction temperatures range from 50° to 150° C, preferably from 75° to 125° C. Generally, a mixture of products wherein $n$ is 1, 2 and 3 is formed in the reaction. The mixture products can be employed in the method of the invention without separation. Alternatively, the mixture can be separated by fractional distillation.

The preparation of alkylidene bis-alkanoates according to Equation (1) is disclosed by E. H. Man, J. J. Sanderson and C. R. Hauser, "J. Amer. Chem. Soc.," 72, 847 (1950), and the preparation of oxymethylene bis-acetate according to Equation (1) is disclosed by C. J. Tomiska and E. Spousta, "Chem. Comm." 211 (1962).

The preparation of methylene dialkanoate is also disclosed in British Pat. NO. 1,036,344, published July 20, 1966; U.S. Pat. No. 3,219,630, issued Nov. 23, 1965, to H. Sidi, and U.S. Pat. NO. 3,336,262, issued Aug. 15, 1967, to H. Sidi.

UTILITY

The di-esters are useful for controlling fungi such as bacteria, molds, mildews, and yeasts. The di-esters are particularly effective for the control of seed- and soil-borne fungi such as Rhizopus species, Penicillium species, Fusarium species, and Aspergillus species.

In addition to inhibiting microbial attack of animal feedstuffs, the di-carboxylic acid esters preserve carotene value, protein, vitamins and other nutrients of the feedstuffs, promote improved feed efficiency response and greater weight gain in animals fed the treated feedstuff compositions.

The di-carboxylic acid esters of the invention are effective for improving feed efficiency response in meat-producing animals, for example poultry, swine and ruminants.

The di-carboxylic acid esters are particularly advantageous for improving feed efficiency response in ruminant animals such as cattle, goats, and sheep.

In the event the anti-fungal properties of the di-carboxylic acid esters are not required or desired, the nutritional and feed utilization benefits of the di-carboxylic acid esters can be obtained by orally administering a feed-efficiency-improving amount of the di-esters to animals in the form of tablets, capsules, powders, solutions, suspensions, or in admixture with one or more components of the animals' diets. Alternatively, the di-carboxylic acid esters can be administered in a liquid carrier such as the animals' drinking water. The di-carboxylic acid esters can also be used as a premixed formulation in which the di-ester is distributed uniformly throughout a standard animal-feed carrier. The premixed formulation is then mixed with a normal diet for the animal desired. Examples of such nutrient feed carriers are soy-bean meal, corn oil, ground corn, barley, wheat, mineral mixtures such as vermiculite, diatomaceous earth, corn gluten meal, corn distiller solubles or soy flour. Di-carboxylic acid esters will usually be present in from about 1 to 75% by weight of the premixed formulation.

The dosage level at which the di-esters are applied to prevent fungus growth depends upon the type of animal feedstuff being treated, its moisture content, temperature, and the period over which preservation against fungus growth is desired. Generally, amounts of di-ester ranging from about 0.01% weight to 10% weight, based on weight of the animal feedstuff being treated, are satisfactory for most applications, although amounts from about 0.1% to 5% weight, calculated on the same basis, are more often employed. In the preservation of animal feedstuffs such as cereal grains and seeds during storage, amounts of di-ester ranging from 2 to 20 ounces per bushel are generally suitable.

The dosages defined above are also sufficient to produce significant animal feed responses. However, the preferred amounts for animal feed responses will vary to some extent, depending upon the age, weight and environment of the particular species of animal being fed. Generally, the di-esters are administered to meat-producing animals in a daily amount of about 0.04 mg to about 80 mg per kg of body weight. Preferably the di-esters are administered to animals in a daily amount of about 0.04 mg to about 40 mg per kg of body weight.

Illustrative animal feedstuffs suitably protected against fungal attack during storage or suitably used as carriers for providing the diesters to animals for animal feed responses are forage crops such as alfalfa, clover, hay, fodder, etc.; seeds and cereal grains such as flax, corn, wheat, oats, rice, barley, rye; and other nutritious feedstuffs or by-product feedstuffs such as ground corn, oat hulls, ground milo, soy-bean meal, fish meal, cotton-seed meal, linseed meal, wheat midlings, corn gluten meal, molasses, soy-bean oil, peanut oil, corn oil, sesame oil, and the like. In addition, the di-ester-treated animal feedstuff compositions may also contain stabilizers and other feed adjuvants such as vitamins, antibiotics, minerals, hormones, steroids, and other feed supplements of this nature.

The di-esters can also be administered to animals for feed responses subcutaneously or intramuscularly in the form of solutions, pastes, or pellets, but it is generally more convenient to use the di-esters in the animals' feed composition.

EXAMPLES

The following examples illustrate the compounds and/or compositions and methods of this invention. The examples are intended to illustrate the invention and are not considered restrictive of the invention as otherwise described herein. Indicated ratios and percentages are by weight unless otherwise specified.

EXAMPLE 1

Preparation of Methylene Bispropionate 6 g of paraformaldehyde (0.2 mol of formaldehyde) and 26 g (0.2 mol) of propionic anhydride were mixed in a vessel to which one drop of $H_2SO_4$ was added. The tube was sealed and heated at 100° C for 18 hours.

In a companion preparation, 21 g of paraformaldehyde (0.7 mol of formaldehyde) and 91.0 g (0.7 mol) propionic anhydride were mixed in a reaction flask to which one drop of $H_2SO_4$ was added. The mixture was refluxed for 2 hours.

The two mixtures were combined and fractionated. The first fraction, 93 g, boiled at 90° to 95° C at 25 mm pressure. The second fraction, 22 g, boiled at 130° C at 25 mm pressure. The product of the first fraction was identified by nuclear magnetic resonance (NMR) as methylene bispropionate. The product of the second fraction was identified by NMR as oxybis-methylene bispropionate.

EXAMPLE 2

Preparation of Oxybismethylene Bispropionate 44.5 g of paraformaldehyde (1.5 mol of formaldehyde) and 200.0 g. (1.25 mol) of oxymethylene bispropionate were mixed in a vessel to which one drop of $H_2SO_4$ was added. The vessel was sealed and heated at 100° C for 72 hours. Fractionation of the product gave oxybismethylene bispropionate (ca. 50%) having a boiling point of 85.5° C at 1 mm pressure and bisoxymethylene bispropionate (ca. 15%) having a boiling point of 98° C at 1 mm Hg pressure.

EXAMPLE 3 preparation of Methylene Bisacetate and Oxybismethylene Bisacetate 20.4 g of acetic anhydride (0.2 mol), 6.0 g of paraformaldehyde (0.2 mol of formaldehyde) and 2 drops of sulfuric acid were heated at 100° C in a sealed tube for 18 hours. Fractionation of the product gave methylene bisacetate and oxybismethylene acetate.

EXAMPLE 4

Preparation of Methylene Bisisobutyrate and Oxybismethylene Bisisobutyrate

A 30-g (0.33 mol) sample of trioxane was added to a solution of 158 g (1 mol) isobutyric anhydride and 0.5 ml 70% perchloric acid over a 30-minute period at 65°–70° C. The reaction mixture was then stirred until the temperature decreased to 27° C. The reaction mixture was diluted with saturated sodium bicarbonate solution and extracted with ether. The ether extracts were dried over magnesium sulfate and evaporated under reduced pressure. The resulting residue was distilled on a 30-cm column to give 112 g of methylene bisisobutyrate, b.p. 43°–48° C. at 0.2–0.3 mm of Hg and 30 g of oxybis-methylene isobutyrate, b.p. 57°–63° C. at 0.2–0.3 mm of Hg.

EXAMPLE 5

Preparation of Methylene Bisbutyrate and Oxybi5methylene Bisbutyrate

Trioxane (0.33 mol) and butyric anhydride (1 mol) were reacted using perchloric acid as catalyst by the procedure employed in Example 4. The resulting methylene bisbutyrate product (82 g) distilled at 55°–58° C (0.02 mm/Hg) and the resulting oxybismethylene bisbutyrate product (33 g) distilled at 65°–68° C (0.02 (0.02 mm/Hg).

EXAMPLE 6

Preparation of Benzylidene Bispropionate

Benzaldehyde (1.5 mol) and propionic anhydride (1.5 mol) were reacted in the presence of 0.5 ml perchloric acid by the procedure of Example 4. The resulting benzylidene bispropionate distilled at 104° C (0.1 (mm/Hg).

EXAMPLE 7

Preparation of Ethylidene Bispropionate

An 88-g (2 mols) sample of acetaldehyde was added in small portions to a solution of 260 g (2 mols) of propionic anhydride at 60° C. The reaction mixture was then stirred at about 25° C for 7 hours. The reaction mixture was diluted with saturated sodium bicarbonate solution and extracted with methylene dichloride. The methylene chloride extracts were dried over magnesium sulfate and evaporated under reduced pressure. The resulting residue was distilled through a 16 inch column to give 316.5 g of ethylidene bispropionate, b.p. 57° C. (1 mm/Hg).

EXAMPLE 8

Preparation of 2,2,2-Trichloroethylidene Bispropionate

Trichloroacetaldehyde (0.2 mol) and propionic anhydride (0.2 mol) were reacted in the presence of 0.2 ml 70% perchloric acid by the procedure of Example 4. The resulting 2,2,2-trichloroethylidene bispropionate product (13 g) distilled at 65°–66° C (0.1 mm/Hg). Elemental analysis for $C_8H_{11}Cl_3O_4$ showed: %Cl, calc. 38.3, found 38.1.

EXAMPLE 9

Preparation of Allylidene Bispropionate

To a solution of 345 g (2.65 mols) propionic anhydride and 1.05 g concentrated sulfuric acid maintained at 45°–50° C was added dropwise 140 g (2.5 mols) acrolein over a period of 15 minutes. The reaction mixture was stirred for an additional 10 minutes. A 2.6 g-sample of 2,4,6-trimethyl-pyridine was then added and the reaction mixture stirred at about 25° C. for about 17 hours. The reaction mixture was then distilled through a short column to give 268 g of the product as a slightly yellow liquid, b.p. 96°–101° C (0.25 mm Hg).

EXAMPLE 10

Di-Ester-Treated Corn Feed Composition

High-moisture corn (25% moisture) was treated with various methylene and polyoxymethylene esters of propionic or acetic acid of various dosages. The esters were applied to the corn in a mixer for 1 minute at 32 rpm. Three identical 2-gallon ventilated cans were filled with the treated corn. The cans were then held at a temperature of 70°–72° F.

Temperature readings were taken semi-weekly by means of thermocouples in the center of each can. Fungal and bacteria fermentation of feeds is exothermic by nature and can be estimated by temperature measurements. When the temperature exceeded constant room temperature for at least an 8-hour period, the treatment was considered broken.

Visual observations were also made on the amount of corrosion damage to the can (due principally to moisture condensation). This damage was rated on a 1-to-10 basis, 1 indicating no corrosion and 10 indicating heavy corrosion. The results of these tests are tabulated in Table II.

The foregoing treated corn is usefully fed to cattle for increased rate of weight gain and improved utilization of feed.

EXAMPLE 11

Di-Ester-Treated Agricultural Feed Compositions

Methylene bispropionate was applied to a variety of crops at various dosages by spraying or in a mixer. Two ventilated cans were filled with each treated crop. The cans were then maintained at 70° F±15° F. Each can was periodically visually observed for fungal growth and the observations were translated into a growth rating on a 1-to-10 basis, 1 indicating no growth and 10 indicating heavy, uniform growth. For comparison, two samples of each untreated crop were also tested. The crops employed, the percent weight methylene bispropionate (MBP) based on weight crop, and the fungal rating 2, 7–8 and 28–29 days after treatment are tabulated in Table III.

The above di-ester-treated agricultural products are usefully fed to animals such as poultry, swine, cattle and sheep for greater weight gain and feed utilization.

EXAMPLE 12

Differential Fungal Control of Treated Corn by Various Di-Esters

A variety of bis-esters was tested for the control of seed- and soil-borne pathogens during storage of corn seeds (*Zea mays*) by the following procedure.

A small amount of acetone was added to the bis-ester to make specific volume, plus a small portion of emulsifier, making it into a slurry. This preparation was diluted with water to the desired concentration. The solution was then evenly distributed on the wall of a glass jar. High-moisture feed corn with natural infection was stored frozen after harvest until used for this test. The corn seeds were rolled in the jar until they were coated and the solution was completely absorbed on them.

Following the treatment, the corn seeds were plated on Potato Dextrose Agar plates. For comparison, untreated corn seeds were also plated. Propionic acid was also tested for comparison.

The percentage control of all species was based on the total sum average of mycelial growth in millimeters of all species in the treated seeds relative to the untreated check. The fast-growing Rhizopus was evaluated 7 days after treatment, the other fungi after 14 days.

The bis-ester tested, the concentration of active ingredient (ounces/100 lbs. of seeds), the average mycelial growth in millimeters each pathogen (average of 4 tests), sum of the averages of all species and the percent control are tabulated in Table V.

EXAMPLE 13

Swine Feeding Study

Corn grain (28% moisture) treated with 0.61% (w/w) methylene bispropionate (MBP) was compared to dry (15% moisture) corn grain in feeding trials with piglets.

One hundred twenty cross-bred piglets of approximately 3 weeks of age and weighing 15 pounds were randomly assigned to the MBP-treated and the untreated corn rations. The treated and untreated corn was fed along with a complete soybean meal ration. Water was available free-choice.

Observations of feed consumption and feed efficiency (lb. of grain/lb. of feed) were taken at bi-weekly intervals. The duration of the feeding trial was 6 weeks for each trial. The results are tabulated below.

| Trial No. | Feed Efficiency | |
|---|---|---|
|  | Control | MBP-treated Corn |
| 1 | 1.79 | 1.98 |
| 2 | 1.89 | 2.16 |
| 3 | 2.03 | 2.18 |
| 4 | 2.45 | 2.22 |
| Average | 2.04 | 2.14 |

TABLE I

| R | R$^1$ | R$^2$ | n |
|---|---|---|---|
| Methyl | H | Methyl | 1, 2 or 3 |
| Methyl | H | Ethyl | 1 |
| Methyl | H | Propyl | 2 |
| Ethyl | H | Ethyl | 3 |
| Propyl | H | Allyl | 1, 2 or 3 |
| Isopropyl | H | Isopropyl | 1, 2 or 3 |
| n-Butyl | H | n-Butyl | 1, 2 or 3 |
| Isobutyl | H | Isobutyl | 1 or 2 |
| Methyl | Methyl | Methyl | 1 |
| Ethyl | Methyl | Ethyl | 1 |
| Propyl | Trichloromethyl | Propyl | 1 |
| Isopropyl | Methyl | Isopropyl | 1 |
| Methyl | 1,1,2,2-Tetrachloroethyl | Methyl | 1 |
| Methyl | o-Tolyl | Hexyl | 1 |
| Hexyl | Allyl | Hexyl | 1 |
| Allyl | H | Allyl | 1 or 2 |

TABLE II

| Compound | Rate, Oz/Bu | Weeks Effective | Corrosion 42 Days | Corrosion 83 Days |
|---|---|---|---|---|
| Propionic acid | 2 | 6 | 0 | — |
|  | 3 | 6 | 0 | — |
|  | 4 | 12+ | 0 | 1 |
|  | 6 | 12+ | 2 | 3 |
| Methylene bispropionate | 3 | 12+ | — | — |
|  | 6 | 12+ | — | — |
| Oxybismethylene propionate | 2 | 6 | 0 | — |
|  | 3 | 12 | 0 | 0.5 |
|  | 4 | 12+ | 0.5 | 0.5 |
|  | 5 | 12+ | 1 | 1 |
| Methylene bisacetate | 3 | 6 | — | — |
|  | 6 | 12+ | — | — |
| Oxybismethylene acetate | 3 | 5 | — | — |
|  | 6 | 12+ | — | —. |

+ indicates treatment still effective and not broken at time indicated

TABLE III

| Crop | %Wt MBP | Fungal Rating (Days) 2 | 7–8 | 28–29 |
|---|---|---|---|---|
| Sorghum (33% H$_2$O) | 0.51 | 0 | 0 | 0 |
|  | 0 | 8 | 10 | — |
| Wheat (26% H$_2$O) | 0.6 | 0 | 0 | 0 |
|  | 0 | 0.5 | 3 | — |
| Hay (4" seedlings) | 2.4 | 0 | 0 | 4 |
|  | 0 | 2 | 10 | — |
| Soybeans (25% H$_2$O) | 0.51 | 0 | 0 | 0 |
|  | 0 | 0 | 10 | — |

TABLE IV

| Compound | Conc. Oz/100 lb | Average Mycelial Growth (mm) Rhizopus | Penicillium | Fusarium | % Control All Species |
|---|---|---|---|---|---|
| Ethylidene Bispropionate | 16 | 2.3 | 1.05 | 0 | 91 |
|  | 6.4 | 6.7 | 5.4 | 1.4 | 63 |
|  | 2.5 | 11.4 | 5.6 | 1.2 | 50 |
|  | 1.0 | 11.5 | 5.7 | 3.0 | 44 |
| Methylene Bisisobutyrate | 16 | 0 | 0.6 | 0 | 98 |
|  | 6.4 | 0 | 0 | 0 | 100 |
|  | 2.5 | 0.35 | 0 | 0 | 99 |
|  | 1.0 | 0.32 | 0.3 | 0 | 98 |
| Oxybismethylene Bisisobutyrate | 16 | 0 | 0 | 0 | 100 |
|  | 6.4 | 0 | 0 | 0 | 100 |
|  | 2.5 | 0 | 4.8 | 0 | 87 |
|  | 1.0 | 0 | 9.7 | 0 | 73 |
| Benzylidene Bispropionate | 16 | 0.6 | 2.8 | 0 | 91 |
|  | 6.4 | 4.4 | 2.7 | 0.6 | 79 |
|  | 2.5 | 14.3 | 2.3 | 0 | 54 |
|  | 1.0 | 15.9 | 3.9 | 0 | 46 |
| Methylene Bisbutyrate | 16 | 0 | 0 | 0 | 100 |
|  | 6.4 | 0 | 0 | 0 | 100 |
|  | 2.5 | 0 | 0 | 0 | 100 |
|  | 1.0 | 0 | 2.4 | 0 | 93 |
| Oxybismethylene Bisbutyrate | 16 | 0 | 0 | 0 | 100 |
|  | 6.4 | 0 | 0 | 0 | 100 |
|  | 2.5 | 0 | 0 | 0 | 100 |
|  | 1.0 | 0 | 0 | 0 | 100 |
| 2,2,2-Trichloroethylidene Bispropionate | 16 | 1.3 | 2.6 | 0 | 89 |
|  | 6.4 | 5.2 | 4.1 | 0 | 74 |
|  | 2.5 | 5.3 | 4.5 | 7 | 54 |
|  | 1.0 | 19.3 | 4.4 | 9.6 | 8 |
| Methylene Bispropionate | 16 | 0 | 0 | 0 | 100 |
|  | 6.4 | 0 | 0 | 0 | 100 |
|  | 2.5 | 0 | 0 | 0 | 100 |
|  | 1.0 | 0 | 0.32 | 0.9 | 97 |
| Ethylidene Bisacetate | 16 | 0 | 0 | 0 | 100 |
|  | 6.4 | 2.6 | 0 | 0 | 93 |
|  | 2.5 | 4.3 | 0 | 0.5 | 87 |
|  | 1.0 | 10.0 | 2.1 | 2.3 | 60 |
| Propionic Acid | 16 | 0 | 0.42 | 0 | 99 |
|  | 6.4 | 0.4 | 0 | 0 | 99 |
|  | 2.5 | 3.4 | 1.9 | 9.1 | 60 |
|  | 1.0 | 11.1 | 3.8 | 11.2 | 28 |

TABLE IV-continued

| Compound | Conc. Oz/100 lb | Average Mycelial Growth (mm) Rhizopus | Penicillium | Fusarium | % Control All Species |
|---|---|---|---|---|---|
| Control | 0 | 19.6 | 4.7 | 12.1 | — |

What is claimed is:

1. A method for improving utilization of feed in animals which comprises orally administering to said animals a daily amount of about 0.04 mg to about 80 mg per kg of body weight of a di-ester of the formula $$RCO(CHO)_n CR^2$$
$$\phantom{RCO(}\overset{\|}{O}\phantom{(C}\overset{R^1}{|}\phantom{HO)_n C}\overset{\|}{O}$$

wherein R is alkyl of 1 to 6 carbon atoms or alkenyl of 2 to 6 carbon atoms, $R^2$ is alkyl of 1 to 6 carbon atoms, and $R^1$ is hydrogen, alkyl of 1 to 6 carbon atoms, chloroalkyl of 1 to 4 carbon atoms and 1 to 5 chloro groups, alkenyl of 2 to 6 carbon atoms, phenyl, or alkphenyl of 7 to 10 carbon atoms, and $n$ is 1, 2 or 3.

2. The method of claim 1 wherein R is alkyl of 1 to 6 carbon atoms, $R^2$ is alkyl of 1 to 6 carbon atoms, and $R^1$ is hydrogen or alkyl of 1 to 6 carbon atoms.

3. The method of claim 2 wherein $R^1$ is hydrogen and $n$ is 1 or 2.

4. The method of claim 3 wherein R and $R^2$ are methyl.

5. The method of claim 3 wherein R and $R^2$ are ethyl.

6. The method of claim 3 wherein R and $R^2$ are n-propyl.

7. The method of claim 3 wherein R and $R^2$ are iso-propyl.

8. The method of claim 1 wherein the animals are poultry, swine and ruminants.

9. The method of claim 8 wherein the compound is administered to said animals in combination with an animal feed.

10. The method of claim 9 wherein $R^1$ is hydrogen, R and $R^2$ are the same alkyl of 1 to 3 carbon atoms and $n$ is 1.

* * * * *